US012017225B2

(12) United States Patent
Walsh

(10) Patent No.: US 12,017,225 B2
(45) Date of Patent: Jun. 25, 2024

(54) METHOD AND APPARATUS FOR PROVIDING AN ISOLATED SINGLE CELL

(71) Applicant: Edmond Walsh, Oxford (GB)

(72) Inventor: Edmond Walsh, Oxford (GB)

( * ) Notice: Subject to any disclaimer, the term of this patent is extended or adjusted under 35 U.S.C. 154(b) by 642 days.

(21) Appl. No.: 17/265,882

(22) PCT Filed: Aug. 8, 2019

(86) PCT No.: PCT/GB2019/052233
§ 371 (c)(1),
(2) Date: Feb. 4, 2021

(87) PCT Pub. No.: WO2020/030917
PCT Pub. Date: Feb. 13, 2020

(65) Prior Publication Data
US 2021/0162401 A1 Jun. 3, 2021

(30) Foreign Application Priority Data
Aug. 10, 2018 (GB) ..................................... 1813094

(51) Int. Cl.
*B01L 3/00* (2006.01)

(52) U.S. Cl.
CPC ....... *B01L 3/5088* (2013.01); *B01L 2300/025* (2013.01)

(58) Field of Classification Search
None
See application file for complete search history.

(56) References Cited

U.S. PATENT DOCUMENTS

| | | | |
|---|---|---|---|
| 6,180,239 B1 | 1/2001 | Whitesides et al. |
| 2017/0307486 A1 | 10/2017 | Leck et al. |
| 2017/0342367 A1 | 11/2017 | Figg et al. |

FOREIGN PATENT DOCUMENTS

| | | | |
|---|---|---|---|
| CA | 2531972 A1 | 2/2005 |
| CN | 1863599 A | 11/2006 |
| CN | 101652660 A | 2/2010 |
| EP | 1053784 A2 | 11/2000 |
| EP | 3376202 A1 | 9/2018 |

OTHER PUBLICATIONS

Walsh et al., "Using fluid walls for single-cell cloning provides assurance in monoclonality," Oxford Thermofluids Institute, Department of Engineering Science, University of Oxford.
Liberski, A. R. et al., ""One Cell-One Well": A New Approach to Inkjet printing Single Cell Microarrays," ACS Combinatorial Science, 2011, vol. 13, 190-195.
Soitu, C. et al., "Microfluidic Chambers Using Fluid Walls for Cell Biology," PNAS, 2018, vol. 115, pp. E5926-E5933.
Gross A. et al., "Technologies for Single-Cell Isolation," International Journal of Molecular Sciences, 2015, vol. 16, pp. 16897-16919.
Thomas, I., Search Report issued in United Kingdom Application No. 1813094.8 dated Feb. 11, 2019, 5 pages.

*Primary Examiner* — J. Christopher Ball
(74) *Attorney, Agent, or Firm* — MH2 TECHNOLOGY LAW GROUP, LLP

(57) ABSTRACT

Methods and apparatus for providing an isolated single cell are provided. In one disclosed arrangement, a test body of liquid is formed on a substrate surface. A contact angle between the test body of liquid and the substrate surface is lower than an equilibrium contact angle. An optical image of the test body of liquid is analysed to determine whether one and only one cell is present in the test body of liquid.

2 Claims, 10 Drawing Sheets

METHOD AND APPARATUS FOR PROVIDING AN ISOLATED SINGLE CELL

CROSS-REFERENCE TO RELATED APPLICATIONS

This application is a U.S. National Stage application of PCT/GB2019/052233, filed 8 Aug. 2019, which claims priority to GB Application No. 1813094.8, filed 10 Aug. 2018, the entire disclosures of which are hereby incorporated by reference in their entireties.

The invention relates to methods and apparatus for providing isolated single cells, for example for monoclonal cell culturing.

A wide range of applications involving monoclonal cell cultures require that colonies of cells are produced that are known with high reliability to be derived from a single cell. Applications include, for example, therapeutic monoclonal antibody production, stem cell therapy and gene editing. Within a well-plate this is challenging and time consuming, and very often not possible due to the so called "edge-effect" in which the solid walls of the traditional microtiter plate interfere with optical measurements for detecting the presence of cells. Micro-plates (or microtiter/-well plates) are widely used during liquid handling; each plate is essentially an array of miniature test tubes. Plates have an accepted standard size (127.76×85.48×14.22 mm); those with 96, 384, and 1,536 wells/plate are commercially available and have working volumes per well of ~100-500, ~15-150 and ~3-10 microliters, respectively.

In addition to the edge effect, traditional well-plates often require spinning down prior to imaging and/or labelling of cells with fluorescent marker before they can be detected. These additional processing steps add complexity and/or lengthen processing times.

An alternative approach is to deposit small drops containing cells onto localised regions in wells of a well-plate, with the drops being small enough that they do not touch boundary walls of the wells. The above-mentioned edge-effects are thus avoided. Individual drops can be imaged from above or below to determine whether a cell is present. Usually, light is made to pass through the drops and is then imaged. Curvature in the upper interface of each drop can reduce the quality of the image around the edges of the drop. Time is also required to allow cells to fall to the bottom of the drop and allow reliable optical detection.

It is an object of the invention to provide improved methods and apparatus for providing isolated single cells.

According to an aspect of the invention, there is provided a method of providing an isolated single cell, comprising: forming on a substrate surface a test body of liquid, wherein a contact angle between the test body of liquid and the substrate surface is lower than an equilibrium contact angle; analysing an optical image of the test body of liquid to determine whether one and only one cell is present in the test body of liquid.

Thus, a method is provided in which a cell (e.g. in a small volume of liquid) is introduced into a test body of liquid that is flattened relative to an equilibrium droplet shape. The lower curvature allows cells located close to edges of the test body of liquid to be recognized optically with improved confidence. The lower height of the test body of liquid (relative to an equilibrium droplet) reduces the time required for a cell to settle onto the substrate surface, which allows a high quality optical image of the cell to be obtained quickly. The approach makes it possible to determine whether or not a body of liquid comprises one and only one cell quickly and reliably.

In an embodiment, the forming of the test body of liquid comprises: depositing a precursor body of liquid on the substrate surface; and removing a portion of the precursor body of liquid while the precursor body of liquid is in contact with the substrate surface. It has been found that this approach allows test bodies to be produced quickly and easily, as well as providing a high level of control over the final shape of each test body, and high reproducibility.

In an embodiment, the one and only one cell is provided in (i.e. originates from) the precursor body of liquid (i.e. the cell is present before the precursor body is flattened). This approach minimizes the number of processing steps required.

In an embodiment, the method further comprises adding a further volume of liquid to an intermediate body of liquid formed by the removing of the portion of the precursor body of liquid. In an embodiment, the one and only one cell is provided in the further volume of liquid. This approach provides a high probability of a cell being present in the test body of liquid by avoiding the risk of the cell being removed during removal of liquid to form the (flattened) test body. Fluid dynamic effects furthermore mean that a cell present in the further volume of liquid is more likely to settle in a position towards a centre of the test body of liquid, when the further volume of liquid is added, than a cell that is present in the test body of liquid because the cell was already provided in a precursor body of liquid.

In an embodiment, the test body of liquid is overlaid with an overlay liquid and the analysed optical image of the test body comprises an optical image of the test body with the overlay liquid overlaying the test body of liquid. The overlay liquid is immiscible with the test body of liquid. The overlay liquid reduces the size of the refractive index change at the curved boundary of the test body of liquid, thereby facilitating accurate imaging of the test body of liquid even in regions close to the edges of the test body of liquid.

According to an aspect of the invention, there is provided a method of providing an isolated single cell, comprising: providing a test body of liquid on a substrate surface, the test body of liquid containing a single cell; overlaying the test body of liquid with an overlay liquid immiscible with the test body of liquid; and analysing an optical image of the test body of liquid overlaid with the overlay liquid to determine whether the test body of liquid comprises one and only one cell.

According to an alternative aspect of the invention, there is provided a method of providing an isolated single cell, comprising: forming on a substrate surface a test body of liquid, wherein a contact angle between the test body of liquid and the substrate surface is lower than 25 degrees; and analysing an optical image of the test body of liquid to determine whether one and only one cell is present in the test body of liquid.

According to an aspect of the invention, there is provided an apparatus for providing an isolated single cell, comprising: a dispensing unit configured to form a test body of liquid on a substrate surface in such a way that a contact angle between the test body of liquid and the substrate surface is lower than an equilibrium contact angle; an optical system configured to form an optical image of the test body of liquid; and an analysis unit configured to analyse the captured image to determine whether one and only one cell is present in the test body of liquid.

According to an aspect of the invention, there is provided an apparatus for providing an isolated single cell, comprising: a dispensing unit configured to provide a test body of liquid on a substrate surface, and to overlay the test body of liquid with an overlay liquid immiscible with the test body of liquid; an optical system configured to form an optical image of the test body of liquid overlaid with the overlay liquid; and an analysis unit configured to analyse the captured image to determine whether one and only one cell is present in the test body of liquid.

Embodiments of the invention will now be described, by way of example only, with reference to the accompanying drawings in which corresponding reference symbols indicate corresponding parts, and in which.

Figure 20:
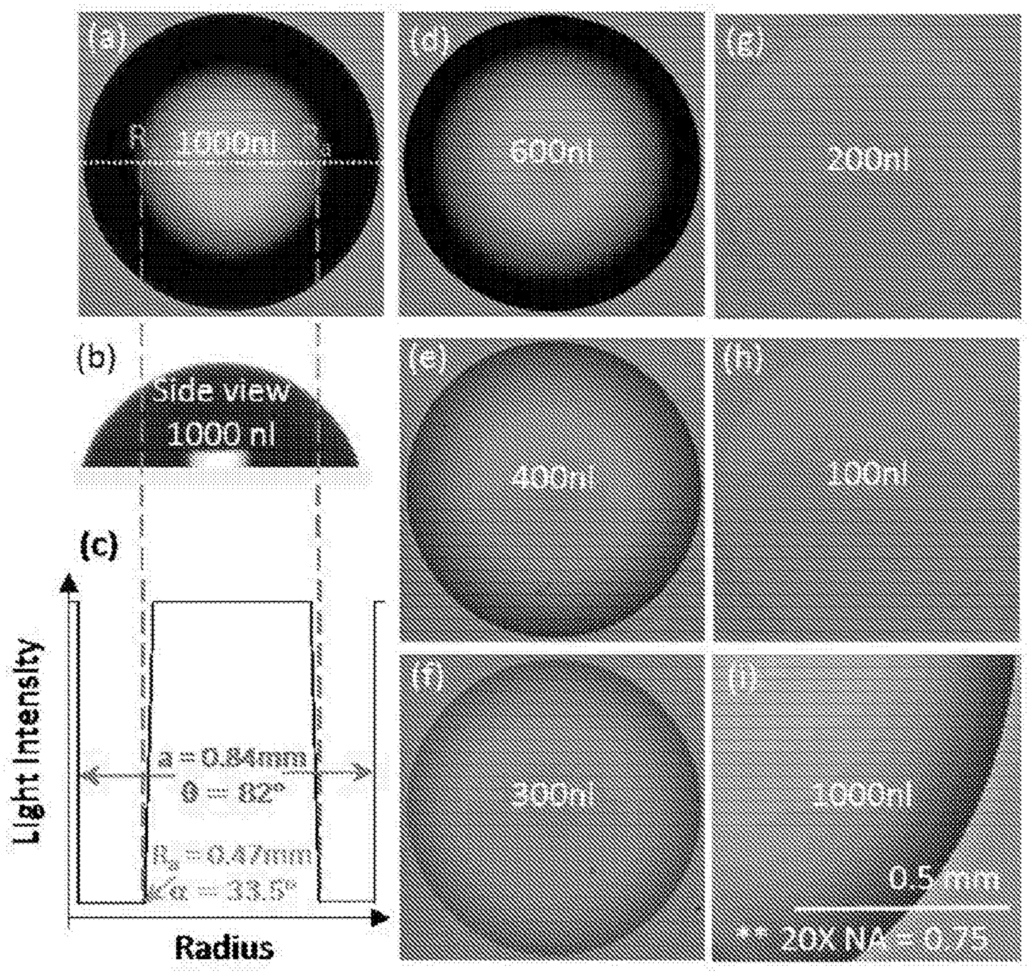

FIG. 20 depicts: Images (a) & (d-h) taken with 10× objective with NA 0.25 (Olympus A10 PL) and image (i) taken with a 20× objective with NA 0.75 (Nikon Plan Apo) on IX53 inverted microscope. (b) taken with FTA instrumentation. Base diameter is 1.68 mm for all drop images and the volume of each drop is indicated. (a) Sessile drop on inverted microscope, (b) side view of drop in (a), (c) plot of light intensity along indicated dotted line in (a). (d-i) drop images with varying volume. Less volume results in reduced curvature thereby reducing the maximum μ and removing dark regions close to the pinning line visible.

Figure 21:
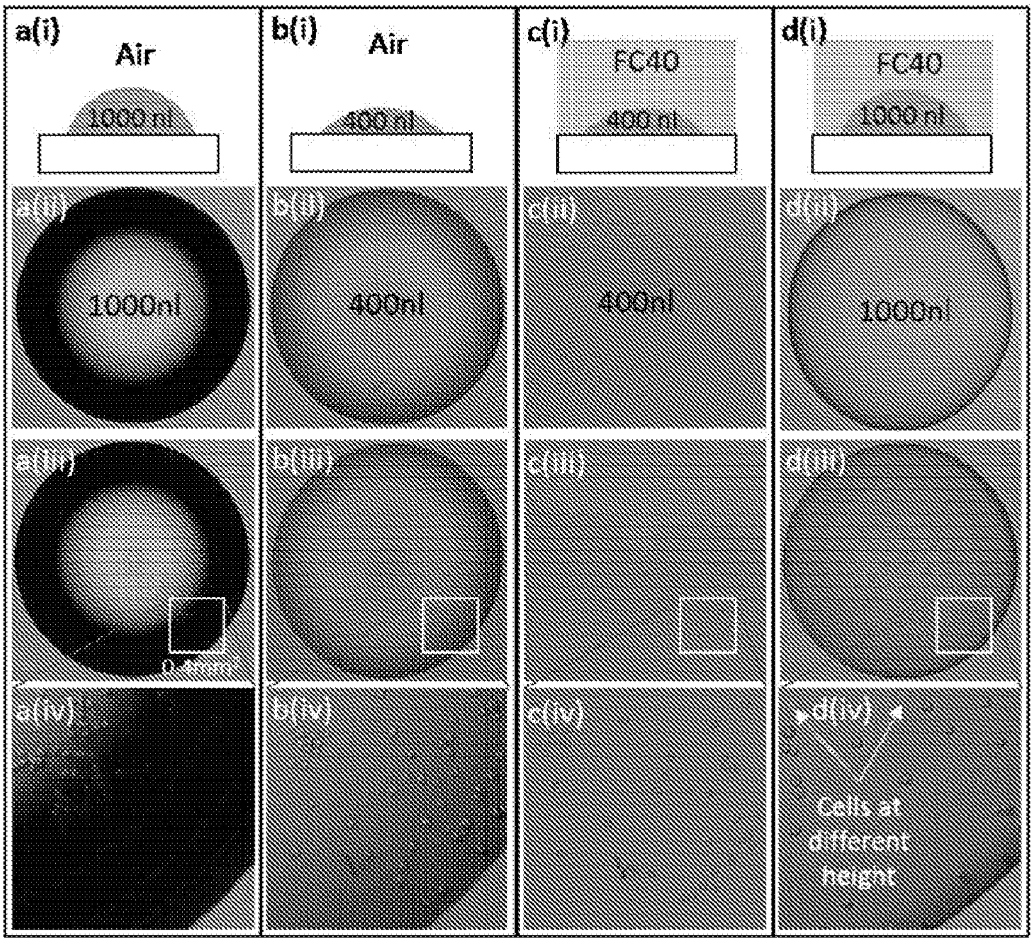

FIG. 21 depicts: Identifying cells in well plates. All drops have the same footprint area, with varying volumes indicated, and image taken with a 10× objective with NA 0.25 (Olympus A10 PL). a(i)-d(i) Illustrations of the experimental setup in each column. a(ii)-d(ii) Images of drops made with DMEM+10% FBS, c(ii) & d(ii) drops submerged in FC40. a(iii)-d(iii) Same drop shape as previous row with HEK cells in media prior to forming drops. a(iv)-d(iv) Magnification of a portion of a(iii)-d(iii).

Figure 1:
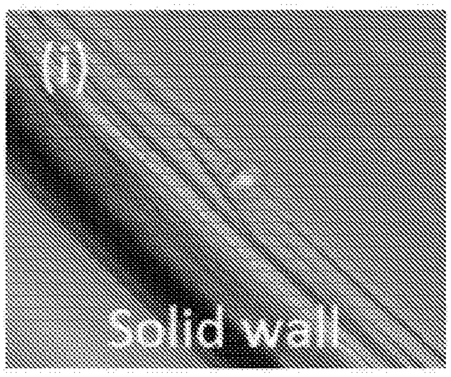
FIG. 1 is an optical image of a cell near to a solid wall of a well plate.
Figure 2:
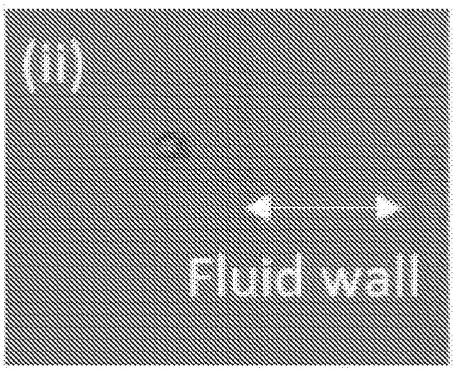
FIG. 2 is an optical image of a cell near to a liquid wall of a reservoir volume separated from an adjacent reservoir volume by a liquid wall.
Figure 3:
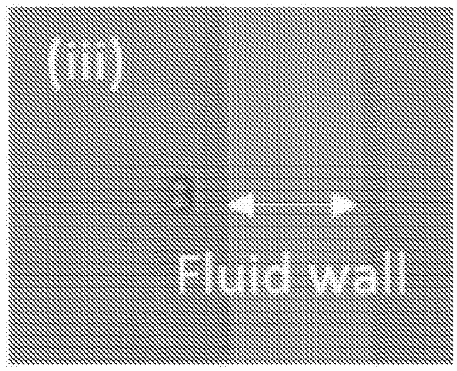
FIG. 3 is an optical image of a cell doublet near to a liquid wall of a reservoir volume separated from an adjacent reservoir volume by a liquid wall.

As discussed in the introductory part of the description, edge-effects can interfere with reliable determination of whether a single cell is present in a well of a well plate. The problem is illustrated in the optical image of FIG. 1, where the presence of a wall optically obscures a cell adjacent to the wall. In this example, the cell is only identifiable by using expensive optics and fluorescence or other labelling of the cell. Even with expensive optics and labelling, the presence of the wall makes cell identification less reliable and potentially more time consuming. The magnitude of the edge-effect can be appreciated by comparing the image of FIG. 1 with the images of FIGS. 2 and 3, which respectively show how a single cell and a cell doublet can be identified more easily when the solid wall is replaced by a liquid wall.

Embodiments of the present disclosure provide methods and apparatus which allow a single cell (i.e. one and only one cell) to be verifiably introduced to a reservoir for monoclonal cell culturing, or other methods requiring single cell isolation, with improved reliability, speed and/or without requiring excessively expensive equipment.

According to a class of embodiments, examples of which are described in detail below with reference to FIG. 4 onwards, a method of providing an isolated single cell comprises forming on a substrate surface 4 a test body 12 of liquid, wherein a contact angle between the test body 12 of liquid and the substrate surface 4 is lower than an equilibrium contact angle, optionally lower than 80%, optionally lower than 60%, optionally lower than 40%, optionally lower than 20%, of the equilibrium contact angle. In an embodiment, the contact angle between the test body 12 of liquid and the substrate surface 4 is nearer to zero, optionally nearer to the receding contact angle, than to the equilibrium contact angle. The method further comprises analysing an optical image of the test body 12 of liquid to determine whether one and only one cell is present in the test body 12 of liquid. The method may comprise capturing an optical image of the test body 12 of liquid and analysing the captured image to determine whether one and only one cell is present in the test body 12 of liquid.

The concept of a contact angle is well known in the art. The contact angle is the angle where a liquid interface meets a solid surface and quantifies the wettability of the solid surface for the liquid in question. For a given system of solid, liquid and vapour/liquid, there is a unique equilibrium contact angle. Contact angle hysteresis is observed in practice, which means that contact angles between a maximal (advancing) contact angle and a minimal (receding) contact angle can be observed in certain circumstances. Various methods are available for measuring contact angles, including for example the static sessile drop method, the dynamic sessile drop method, the single-fiber meniscus method, and the Washburn's equation capillary rise method.

Figure 4:
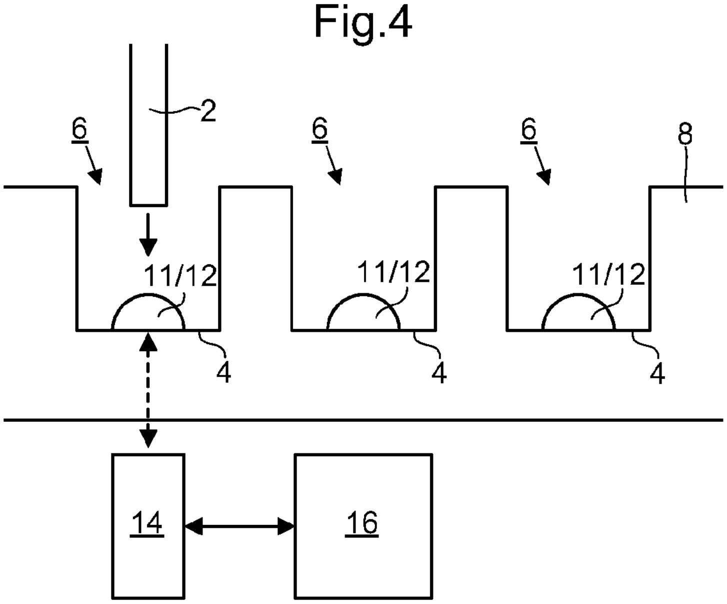
FIG. 4 is a side sectional view depicting a portion of a well plate and use of a dispensing unit to deposit a body of liquid onto a substrate surface in a well and use of an optical system to form an image of the body of liquid.

In an embodiment, as depicted in FIG. 4, a dispensing unit 2 is used to deposit liquid onto the substrate surface 4 in order to provide the test body 12 of liquid. In an embodiment, as described below, the dispensing unit 2 initially deposits a precursor body 11 of liquid, which is processed in subsequent steps to provide the test body 12 of liquid. In an embodiment, the test body 12 and/or precursor body 11 of liquid form a circular drop on the substrate surface 4. In an embodiment, the substrate surface 4 forms a boundary of a reservoir volume 6 for cell culturing. In this example, the substrate surface 4 is the bottom surface of a well of a well plate 8, each well of the well plate 8 providing a different one of the reservoir volumes 6. The well plate 8 may take any of the forms known in the art of well plates, including for example a commercially available well plate. Non-limiting examples of well plates that could be used include well plates having 96, 384, or 1,536 wells/plate, which may have working volumes per well of ~100-500, ~15-150 and ~3-10 microliters, respectively. In the example of FIG. 4, only a small portion of the well plate 8 is shown. In the interests of clarity, use of the dispensing unit 2 is depicted for one of the wells only, but it will be understood that the process can be repeated or performed in parallel for multiple wells.

The nature of the dispensing unit 2 is not particularly limited. Any dispensing unit 2 that is capable of depositing liquid bodies with the required spatial and volumetric precision may be used. The dispensing unit 2 may thus comprise any suitable combination of liquid handling apparatus for this purpose, including for example a suitably configured gantry system for moving an injection head over the surface of the well plate 8 to position the injection head over each well (e.g. piezo, inkjet printer, pump and tubing) and a controller for directing injection of a controlled amount of liquid onto a localized region within each well. The dispensing unit 2 may comprise a plurality of different devices and/or be configured to perform a plurality of different techniques. The dispensing unit 2 may, for example, be additionally configured to remove liquid and thereby act as a liquid removal unit 18 (described below). The dispensing unit 2 may be configured to add an overlay liquid 13 (described below). The dispensing unit 2 may be configured to add a further volume 20 of liquid containing a cell (described below). The dispensing unit 2 may be configured to add media to fill the reservoir, e.g. media for cell culturing (described below).

In an embodiment, an optical system 14 (comprising, for example, one or more lenses, an optical detector and/or a light source) is provided for capturing an optical image of a body of liquid (e.g. a test body 12 or a precursor body 11). The capturing of the optical image may comprise viewing of the optical image by a human and/or, where the capturing is at least partly performed by a machine, storing data representing the optical image, at least until the captured image is analysed (see below). The optical system 14 may be configured such that a focal plane of the optical image is coincident with, or near to, a plane of the substrate surface 4. The optical system 14 may thus preferentially image a portion of a body of liquid on the substrate surface 4 that is directly adjacent to the substrate surface 4, thereby allowing detection of a cell that has settled on the substrate surface 4 with high sensitivity. In an embodiment, the optical system 14 is configured to provide illumination from above and image from below. In an embodiment, an analysis unit 16 is provided that is configured to analyse the captured image to determine whether a single cell (i.e. one and only one cell) is present in the body of liquid being imaged. Alternatively or additionally, the captured image may be analysed (assessed) by a human operator, for example while the optical image is being viewed by the operator using the optical system 14 or while the operator is viewing a version of the captured image displayed on a display, to determine whether a single cell (i.e. one and only one cell) is present in the body of liquid being imaged (or which has been imaged).

The analysis unit 16 may be computer-implemented. The computer may comprise various combinations of computer hardware, including for example CPUs, RAM, SSDs, motherboards, network connections, firmware, software, and/or other elements known in the art that allow the computer hardware to perform the required computing operations. The required computing operations may be defined by one or more computer programs. The one or more computer programs may be provided in the form of media, optionally non-transitory media, storing computer readable instructions. When the computer readable instructions are read by the computer, the computer performs the required method steps. The computer may consist of a self-contained unit, such as a general-purpose desktop computer, laptop, tablet, mobile telephone, smart device (e.g. smart TV), etc. Alternatively, the computer may consist of a distributed computing system having plural different computers connected to each other via a network such as the internet or an intranet.

In an embodiment, the analysis unit 16 uses a pattern recognition algorithm to identify cells within the image captured by the optical system 14. The analysis unit 16 determines that the body of liquid contains one and only one cell when the pattern recognition algorithm identifies one and only one cell in the captured image.

In some embodiments, the optical system 14 images the body of liquid from below. This ensures that the interface of the body of liquid nearest to the optical system 14 is flat (if the substrate surface 4 is flat), which helps produce a clear image. In other embodiments, the optical system 14 images the body of liquid from above.

Figure 5:
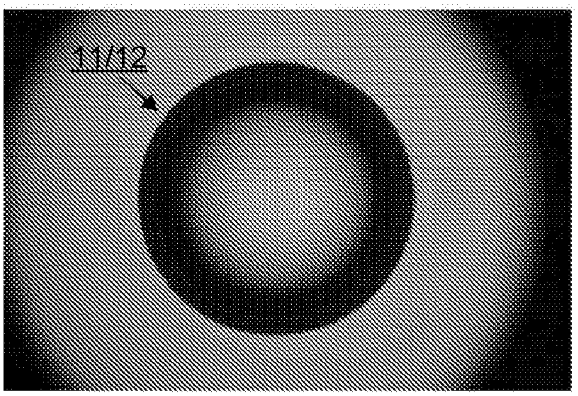
FIG. 5 is an optical image of a body of liquid of the type depicted in FIG. 4.

FIG. 5 depicts an image of a body of liquid of the type depicted in FIG. 4, consisting of a 1 μl drop at equilibrium (with an equilibrium contact angle between the liquid and the substrate surface). Although the interface of the body of liquid nearest to the optical system 14 is flat, the curvature of the upper interface between the drop and air reduces the quality of the image towards the edge of the body (the darker region near the circumference of the circular drop) and makes it more difficult to detect cells reliably in this region.

Figure 6:
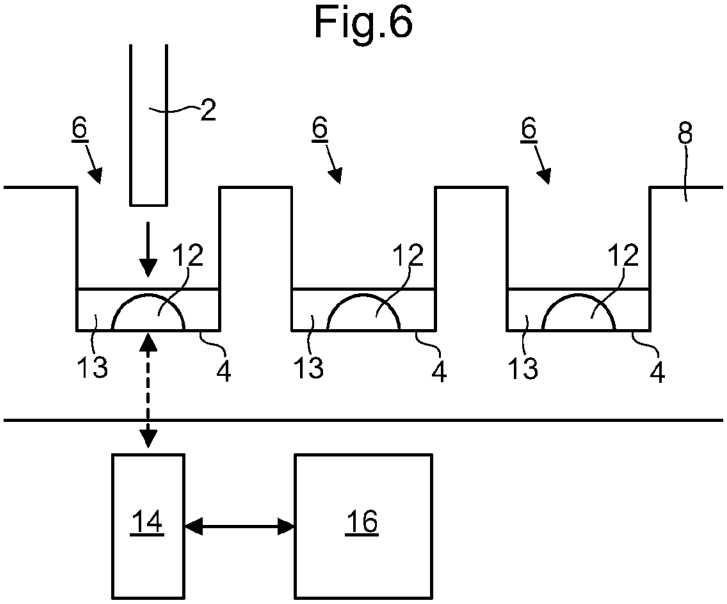
FIG. 6 is a side sectional view depicting a portion of a well plate and use of a dispensing unit to overlay a test body of liquid with an overlay liquid, and use of an optical system to form an image of the overlaid test body of liquid.

In an embodiment, as depicted schematically in FIG. 6, the dispensing unit 2 overlays a test body 12 of liquid with an overlay liquid 13. The test body 12 of liquid may in this case be formed by overlaying a body of liquid that initially had an equilibrium contact angle (or greater), such as the body of liquid illustrated in FIG. 4. Alternatively, as described below, the test body 12 may comprise a flattened body of liquid having a contact angle with respect to the substrate surface 4 that is less than the equilibrium contact angle. The overlay liquid 13 is immiscible with the test body 12 of liquid. In an embodiment, the test body 12 of liquid is aqueous and the overlay liquid 13 is immiscible with water. In an embodiment the overlay liquid 13 comprises an oil. In an embodiment, the overlay liquid 13 comprises a fluorocarbon such as FC40, which is a transparent fully fluorinated liquid of density 1.8555 g/ml that is widely used in droplet-based microfluidics.

Figure 7:
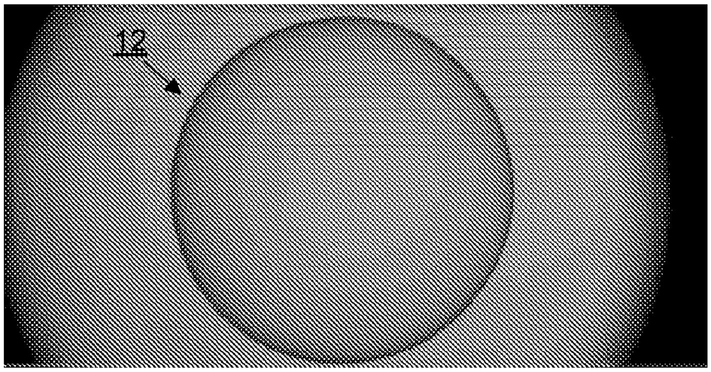
FIG. 7 is an optical image of an overlaid test body of liquid of the type depicted in FIG. 6.

In an embodiment, the refractive index of the overlay liquid 13 is more similar to the refractive index of the test body 12 of liquid (e.g. more similar to the refractive index of water) than to the refractive index of air. This reduces the size of the difference in refractive index at the curved upper boundary of the test body 12 of liquid and, as shown in FIG. 7, thereby mitigates the reduction in image quality towards the edge of the image of the test body 12 and facilitates detection of cells in this region. The improvement can be appreciated by comparing FIG. 5 with FIG. 7.

Figure 8:
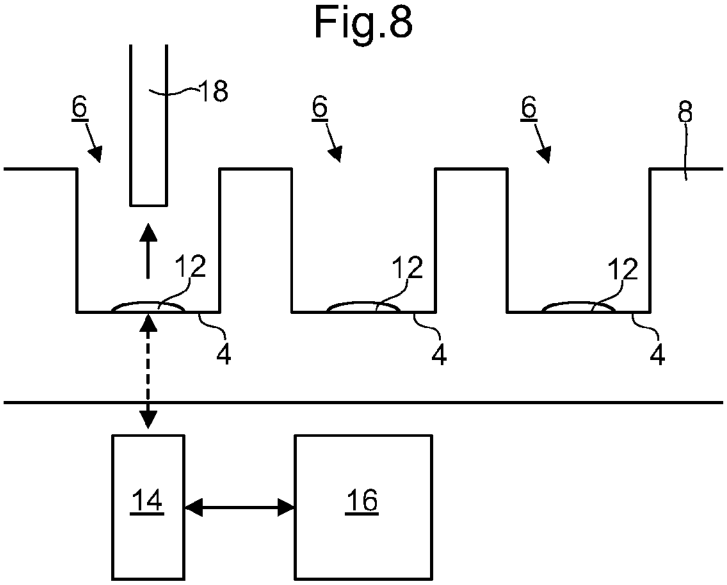
FIG. 8 is a side sectional view depicting a portion of a well plate and use of a liquid removal unit to remove liquid from a precursor body of liquid to provide a test body of liquid.

In an embodiment, as depicted in FIG. 8, the forming of the test body 12 of liquid comprises depositing a precursor body 11 of liquid (e.g. such as a body of liquid with a contact angle equal to or greater than an equilibrium contact angle, such as the body of liquid depicted in FIG. 4), and a liquid removal unit 18 is used to remove a portion of the precursor body 11 of liquid while the precursor body 11 of liquid is in contact with the substrate surface 4. In an embodiment, at least 50% of the precursor body 11 of liquid is removed, optionally at least 60%, optionally at least 70%, optionally at least 80%, optionally at least 90%, optionally at least 95%, optionally at least 99%. The removal is performed such that a contact angle between the resulting body of liquid and the substrate surface 4 is lower than a contact angle between the precursor body 11 of liquid and the substrate surface 4. Thus, for example, the precursor body 11 of liquid may be deposited onto the substrate surface 4 in such a way that the contact angle between the precursor body 11 of liquid and the substrate surface 4 is at or near to an equilibrium contact angle. The removal of liquid may then be implemented by sucking liquid out of the precursor body 11 so that the body of liquid becomes flatter. The contact angle is thus reduced, for example to a contact angle that is between the equilibrium contact angle and a receding contact angle or approximately equal to the receding contact angle. The body of liquid formed by the removal of liquid may be the test body 12 of liquid, ready for imaging to determine whether one and only one cell is present (as depicted in FIG. 8), or may, as described in further detail below, be an intermediate body 121 of liquid to which a further volume of liquid is added at a later stage to supply a cell. Thus, the test body 12 may be a body that is flatter than a precursor body 11 body but less flat than an intermediate body 121. The composition of the liquid of the test body 12 (and, where provided, the intermediate body 121) will normally be substantially the same as the composition of the liquid of the precursor body 11 (e.g. aqueous in both, or all, cases).

The nature of the liquid removal unit 18 is not particularly limited. Any liquid removal unit 18 that is capable of removing liquid with suitable accuracy may be used. The liquid removal unit 18 may thus comprise any suitable combination of liquid handling apparatus for this purpose, including for example a suitably configured gantry system for moving a suction head over the surface of the well plate 8 to position the suction head over each well and a controller for directing suction of a controlled amount of liquid from a localized region within each well. In the interests of clarity, use of the liquid removal unit 18 is depicted for one of the wells only, but it will be understood that the process can be repeated or performed in parallel for multiple wells.

In embodiments of this type, the optical system 14 captures an image of a relatively flat test body 12 of liquid rather than of a test body 12 that is near an equilibrium shape (e.g. as depicted in FIG. 6) but may be otherwise configured as described above. The captured image of the test body 12 of liquid is analysed, for example by the analysis unit 16, to determine whether one and only one cell is present in the test body 12 of liquid. Apart from the fact that the image is derived from a flattened test body 12, the analysis unit 16 may be otherwise configured as described above.

Figure 9:
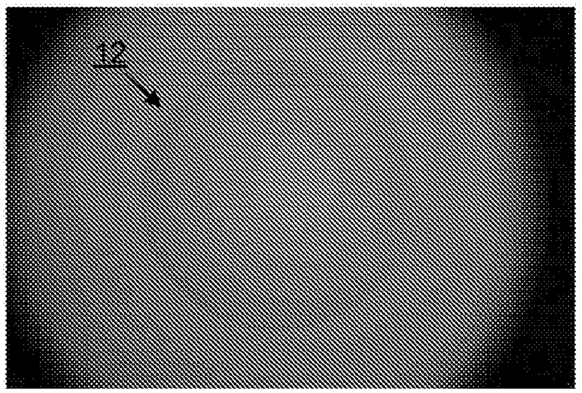
FIG. 9 is an optical image of a test body of liquid of the type depicted in FIG. 8, formed by removing 80% of liquid from the body of liquid imaged in FIG. 5.

FIG. 9 shows an optical image of a test body 12 of liquid of the type depicted in FIG. 8, formed by removing 0.8 nl of liquid from the body of liquid imaged in FIG. 5. The flattening caused by the removal of liquid to form the test body 12 of liquid reduces the curvature of the upper interface and mitigates the reduction in image quality towards the edge of the image of the body of liquid and facilitates detection of cells in this region. The improvement can be appreciated by comparing FIGS. 5 and 9.

Figure 10:
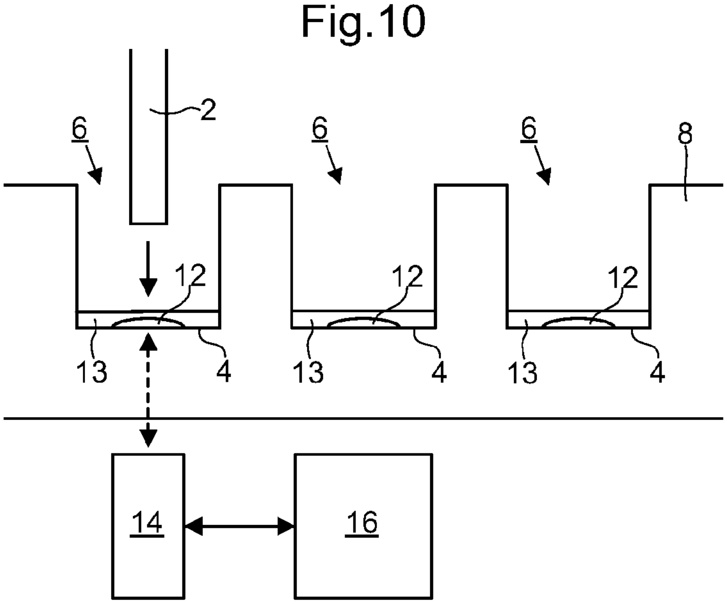
FIG. 10 is a side sectional view depicting a portion of a well plate and use of a dispensing unit to overlay a test body of liquid of the type depicted in FIG. 8 with an overlay liquid, and use of an optical system to form an image of the overlaid test body of liquid.
Figure 11:
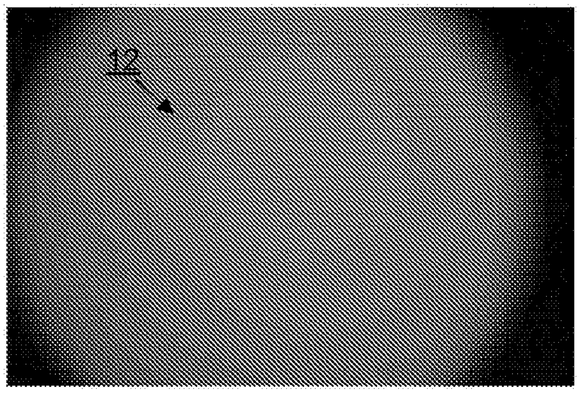
FIG. 11 is an optical image of an overlaid test body of liquid of the type depicted in FIG. 10, formed by overlaying the test body of liquid imaged in FIG. 9.

In an embodiment, as depicted schematically in FIG. 10, the dispensing unit 2 overlays the flattened test body 12 of liquid with an overlay liquid 13. The overlay liquid 13 may take any of the forms described above with reference to FIGS. 6 and 7. The overlay liquid 13 reduces the size of the difference in refractive index at the curved upper boundary of the test body 12 of liquid and, as shown in FIG. 11, thereby mitigates the reduction in image quality towards the edge of the image of the test body 12 and facilitates detection of cells in this region. The improvement can be appreciated by comparing FIG. 5 or 9 with FIG. 11. Indeed, in FIG. 11 the outer edge of the test body 12 is almost invisible.

In an embodiment, the one and only one cell, where present, is provided in (i.e. originates from) the precursor body 11 of liquid (where a precursor body of liquid 11 is used). As described below, the precursor body 11 of liquid may initially be provided with multiple cells but cells may be removed during the formation of the test body 12. In embodiments where the one and only one cell originates from the precursor body 11, no additional steps are required to add cells. For example, cells may be provided in a liquid used to deposit multiple precursor bodies 11 of the liquid, with a concentration of the cells being such that a suitable number of the precursor bodies 11 of liquid will, on average, contain one and only one cell and/or that a suitable number of the test bodies 12 of liquid will contain one and only one cell (even after liquid has been removed to form the test bodies 12 from the precursor bodies 11). Thus, in some embodiments, particularly where a large proportion of the precursor body 11 of liquid is removed to provide a test body 12 of liquid, the precursor body 11 of liquid may initially contain many cells, but with the concentration of the cells in the precursor body 11 being such that when the test body 12 is formed there is a relatively high probability that the test body 12 will contain one and only one cell.

Figure 12:
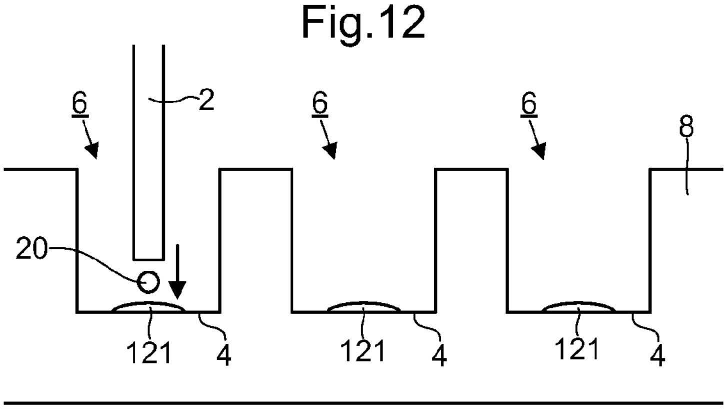
FIG. 12 is a side sectional view depicting a portion of a well plate and adding of a further volume of liquid to an intermediate body of liquid to introduce a cell to the intermediate body of liquid and form a test body of liquid.

Alternatively or additionally, as depicted in FIG. 12, the dispensing unit 2 may be configured to add a further volume 20 of liquid to an intermediate body 121 of liquid, the intermediate body 121 of liquid being a body of liquid formed by removing a portion of a precursor body 11 of liquid (e.g. as described above with reference to FIG. 8). The body of liquid resulting from the addition of the further volume 20 of liquid to the intermediate body 121 of liquid is the test body 12 of liquid ready for imaging and determination of whether one and only one cell is present in the test body 12. The one and only one cell, where present, is provided in the further volume 20 of liquid. The further volume 20 of liquid may be added using single-cell printer technology, for example. In an embodiment, cells are imaged in an ejection head to identify when a single isolated cell is present in a volume of liquid (near a tip) to be ejected and, when a single cell is identified by the imaging, the volume of liquid to be ejected is ejected as the further volume 20 of liquid. Thus, a cell may be added after an intermediate body 121 of liquid has been formed by removing liquid from a precursor body 11 of liquid. This approach may facilitate localisation of the cell towards the centre of the reservoir volume due to fluid dynamic effects, which will favour coalescence of the further volume 20 with the intermediate body 121 in such a way that any cell in the further volume 20 will tend to be localised more towards the centre of the resulting test body 12 than towards the edges of the resulting test body 12. Liquid in the further volume 20 is typically added to the intermediate body 121 near the centre which causes liquid already in the intermediate body 121 to be displaced outwards whereas the newly added liquid remains near the centre.

In an embodiment, the further volume 20 is small enough that the test body 12 of liquid remains relatively flat even though the test body 12 has been formed by addition of the further volume 20 to the intermediate body 121, thereby ensuring that the curvature of the upper interface of the test body 12 remains relatively low and allows reliable detection of a single cell in the test body 12 by the optical system 14. In an embodiment, the volume of the test body 12 of liquid, after the further volume 20 of liquid has been added, is smaller than the volume of the precursor body 11 of liquid. In the example described above in which a precursor body 11 having a volume of approximately 1 μl is provided (FIG. 4) and 800 nl is removed to form the intermediate body 121, the further volume 20 will thus be less than 800 nl. In an embodiment, the further volume 20 is applied using a single cell printer method, such as a drop generating nozzle.

Figure 15:
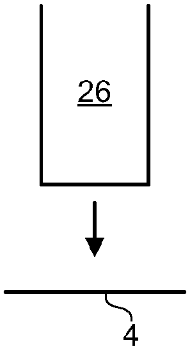
FIGS. 15-17 depict a sequence of operations for forming a test body using an wetted body (e.g. an impregnated porous material).
Figure 16:
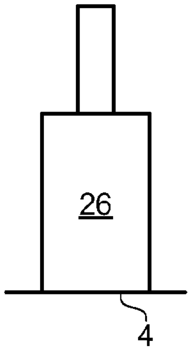
Figure 17:
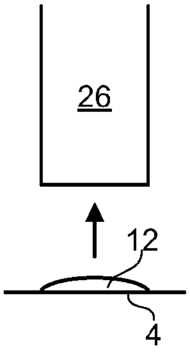
Figure 18:
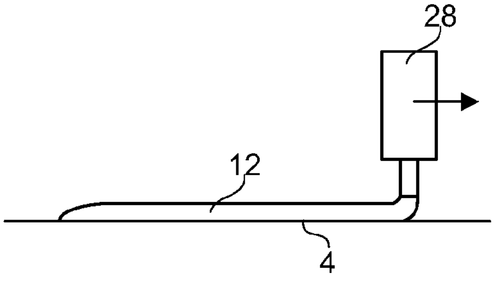
FIG. 18 depicts forming a test body by ejecting liquid from a moving ejection head.

In the embodiments described above, methods are described in which a flatter than equilibrium body of liquid (e.g. the test body 12 or the intermediate body 121) is formed by removing liquid from a precursor body 11. In other embodiments, a flatter than equilibrium body of liquid (suitable for acting as a test body 12 or an intermediate body 121) is formed by directly depositing the body of liquid in the flattened form. In one class of embodiments, as depicted in FIGS. 15-17, this is achieved by bringing a wetted body 26 (e.g. a porous material impregnated with liquid, such as a humid sponge, or a solid member having a body of water formed on it) into contact with the substrate surface 4 continuously over a contact region (which may be referred to as a wetted region) on the substrate surface 4 and then removing the wetted body 26. This approach could directly provide a body of liquid spanning the contact region with a contact angle that is lower than the equilibrium contact angle. In another class of embodiments, as depicted in FIG. 18, a forward printing process may be performed in which liquid is ejected onto the substrate surface 4 from an ejection head 28 while the ejection head 28 is moved relative to the substrate surface 4 in such a way that a body of liquid is formed having a contact angle that is lower than an equilibrium contact angle. This can be achieved by suitable control of the rate of flow of liquid out of the ejection head 28 and the speed of movement of the ejection head 28 relative to the substrate surface 4 (e.g. so the rate of flow is not too high and the speed of movement is not too low). In yet another class of embodiments, a test body 12 is formed that has a very low equilibrium contact angle, optionally lower than 25 degrees (in air and/or when overlaid with an overlay liquid 13 such as FC40), optionally lower than 15 degrees, optionally lower than 10 degrees, optionally lower than 5 degrees, optionally lower than 1 degree. Thus, the benefits related to having a relatively flat test body 12 discussed above can be achieved without necessarily using steps to achieve a contact angle that is less than the equilibrium contact angle (although such steps may be employed to further reduce the contact angle). Various techniques are known for achieving low equilibrium contact angles, including adding surfactants to the liquid. In an exemplary embodiment, a test body 12 is formed that contains a poloxamer such as a Pluronic®, which is known to be particularly compatible with cells. Poloxamers are nonionic triblock copolymers composed of a central hydrophobic chain of polyoxypropylene flanked by two hydrophilic chains of polyoxyethylene. In another exemplary embodiment, a test body 12 is formed which contains Polysorbate 20, which is a polysorbate-type nonionic surfactant formed by the ethoxylation of sorbitan before the addition of lauric acid. Many other non-ionic surfactants could be used with low risk of damage to cells as long as the concentration/exposure time is kept sufficiently low.

Figure 13:
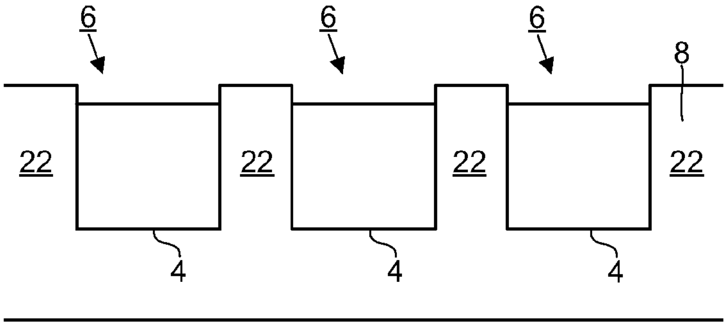
FIG. 13 is a side sectional view depicting a portion of a well plate showing wells after at least partial filling with liquid for cell culturing.

In an embodiment, each reservoir volume 6 is at least partially filled with liquid for cell culturing after it has been determined that the test body 12 of liquid comprises one and only one cell, as depicted in FIG. 13. The at least partial filling may be such that all of a base of each reservoir volume 6 is entirely covered by liquid. In an embodiment, each reservoir volume 6 is filled up to at least 25% (optionally at least 50%, optionally at least 75%) of the height of the reservoir volume 6. In an embodiment, a process of culturing a monoclonal colony of cells is then performed in each reservoir volume 6 for which it has been determined that one and only one cell is initially present. The process of culturing may comprise ensuring that the cells have access to any nutrients, growth factors, hormones and/or gases that may be needed, as well as controlling the physio-chemical environment to maintain suitable conditions. The at least partial filling of each reservoir volume 6 with the liquid for cell culturing may be performed starting from any of the configurations depicted in FIGS. 6, 8 and 10. Where an overlay liquid 13 is provided, the overlay liquid 13 may be removed or partially removed prior to the filling with the liquid for cell culturing or the overlay liquid 13 may be left and removed at a later stage (or not removed at all).

The processes described above (e.g. the forming of the test body 12 of liquid, the optional removal of liquid to provide the test body 12, the optional overlaying, the imaging and analysis steps) are repeated for a plurality of reservoir volumes 6 (e.g. all of the reservoir volumes 6 defined by respective wells in a well plate) and a monoclonal colony of cells is cultured in each of the reservoir volumes 6 in which it is determined that one and only one cell is initially present. In an embodiment, the plurality of reservoir volumes 6 are separated from each other by solid walls 22 (as depicted in FIG. 13). In an embodiment, each test body 12 of liquid is provided in a central region of a respective reservoir volume 6 so as not to be in contact with any of the solid walls 22 separating the reservoir volume 6 from other reservoir volumes 6.

Figure 14:
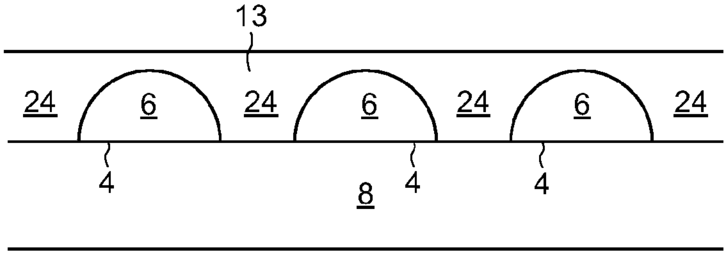
FIG. 14 is a side sectional view of an alternative embodiment in which reservoir volumes are separated from each other by liquid walls rather than solid walls.

In an alternative embodiment, the plurality of reservoir volumes 6 are separated from each other by liquid walls 24 (as depicted in FIG. 14). The reservoir volumes 6 in this case may be formed by adding liquid for cell culturing to the test bodies 12 of liquid after detection of single cells has been performed. The added liquid may be such that a footprint of each reservoir volume 6 on the substrate surface 4 is the same as the footprint of the respective corresponding test body 12 of liquid (by ensuring that contact angle of each reservoir volume 6 with the substrate surface 4 does not exceed the advancing contact angle). The plurality of reservoir volumes 6 are overlaid with an overlay liquid 13. The overlay liquid may take any of the forms discussed above (e.g. FC40). The liquid walls 24 are thus formed from the overlay liquid 13 between the reservoir volumes 6.

Background Theory and Further Experimental Validation

References in the discussion below to "drops" should be understood to encompass bodies (e.g. test bodies) of liquid formed on a substrate surface, as described above.

Theory

The maximum angle, $\mu_m$, for which light rays are accepted by a microscope objective in air can be calculated with knowledge of the numerical aperture (NA)

$$\mu_m=\sin^{-1} \mathrm{NA}$$

Light rays with angles that exceed $\mu_m$ will not reach the image plane and hence may result in dark regions. As light rays pass through a curved liquid surface, such as drop (e.g. a test body of liquid on a substrate surface), the change in refractive index results in the light being refracted in accordance with Snell's law. To illustrate this effect a water sessile drop, with refractive index n=1.33, is placed on a polystyrene, n=1.58, surface (common well plate material) surrounded by air, n=1. If the drop radius is less than the capillary length $$\left(\lambda_c < \sqrt{\frac{\gamma}{\Delta\rho g}}\right)$$

then gravity has a negligible effect and the drop has the shape of a spherical cap. For a spherical cap, depicted in FIG. 19(*a*), the maximum height, h, radius of curvature, R, volume, $V_{cap}$, footprint radius, a, and contact angle, θ are related through $$V_{cap}=\frac{\pi(2-3\cos\theta+\cos^3\theta)}{3}\frac{a^3}{\sin^3\theta}$$

$$h=\frac{a}{\sin\theta}(1-\cos\theta)$$

$$R=\frac{h^2+a^2}{2h}$$

For a known volume and footprint radius the entire drop geometry can be evaluated. Then, with reference to FIG. 19(*a* & b), the angle between a tangent at any point on the surface and the horizontal, a, is provided by $$\alpha=\sin^{-1}\frac{R_a}{R}$$

Figure 19:
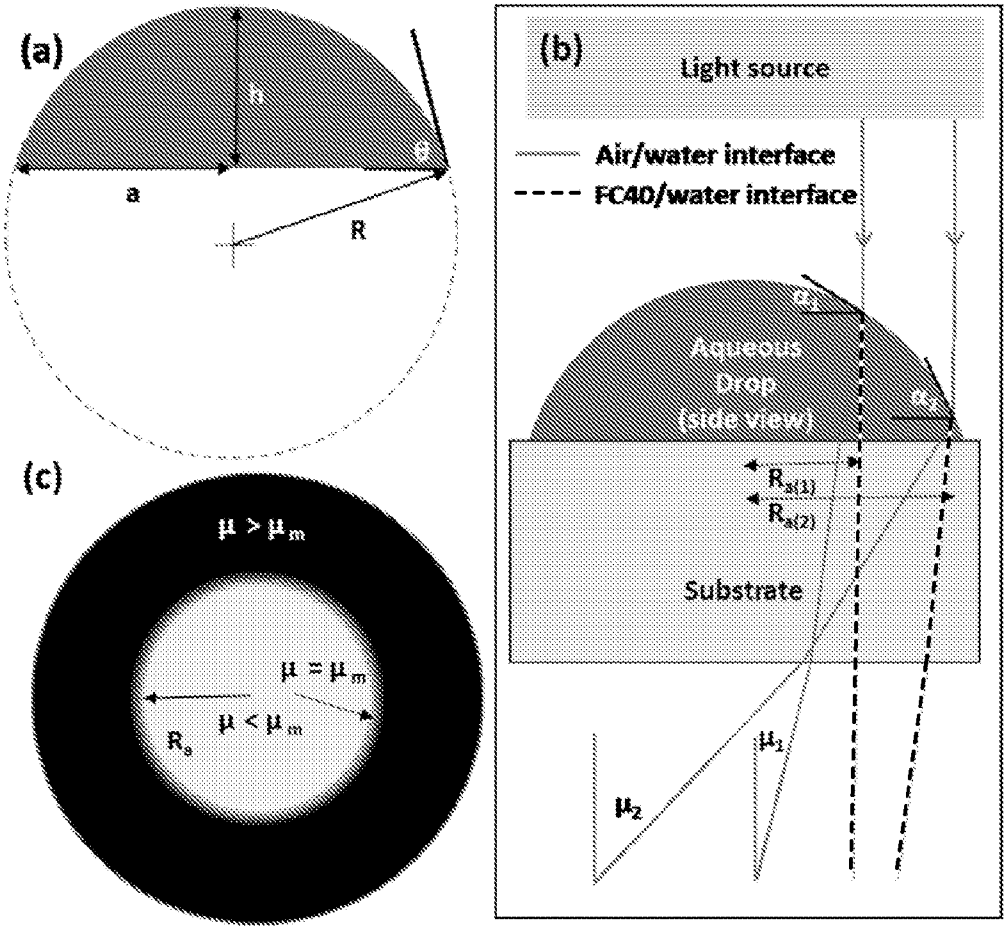
FIG. 19 depicts: (a) Sessile drop nomenclature. (b) Illustration of light path passing through a sessile drop on a polystyrene substrate. Different angles to the drop surface, a, result in different exit angles μ. (c) The refracted light enters the objective when $\mu<\mu_m$, and when $\mu>\mu_m$ dark regions appear on the image.

Using this angle a light ray trajectory through a sessile drop can be determined by satisfying Snell's law of refraction. FIG. 19(*c*) illustrates the path of parallel light through a sessile drop on a polystyrene substrate with an air/water interface (solid light ray paths) and FC40/water interface (broken light ray paths). If the light rays are refracted such that their exit angle, μ, exceeds $\mu_m$; then the image will appear dark in those regions as shown in FIG. 19(*c*), where the indicated $R_a$ coincides with $\mu=\mu_m$, white regions $\mu<\mu_m$ and dark regions $\mu>\mu_m$. When the drop is overlaid with an immiscible fluid such as a fluorocarbon, FC40 with n=1.29, μ is lower than air due to the higher refractive index of the immiscible fluid as illustrated by the broken line light ray paths.

Experimental Setup

To identify single cells in wells plates it is important that the entire region where cells may be deposited in a well have optical clarity; in general, enhanced optical clarity lowers the microscopy and labour/time costs. The principle of replacing the solid wall, with fluid ones—the liquid/fluid interface of the drop becomes the bounding fluid wall—and controlling volumes therein enables complete clarity over the entire drop region with low cost microscope objectives. This method was validated through placing eight 1 μl sessile drops of cell media (DMEM+10% Fetal Bovine Serum (FBS)) with equal volume on a polystyrene substrate. Fluid was extracted from seven, leaving drops with volumes between 100-1000 nl with constant footprint area—the FBS prevents the pinning line from receding as fluid is removed from the drop as it results in a low receding contact angle. Drops were imaged less than ten seconds after being formed to minimise evaporation effects using a Nikon D610 DSLR mounted on an IX53 inverted microscope, operating in bright field mode, fitted with a 10× objective—Olympus A10 PL; NA=0.25. The method works in both bright field and phase contrast microscopy, although the former was exclusively used herein. Contact angles, θ, were calculated as described in the theory section using the measured footprint area (from images using a microscope calibration ruler); and also measured directly by the sessile drop method using First Ten Angstroms (FTA) instrument and software. For the latter method drops were formed by ejecting a 1 μl drop using a needle (33G blunt NanoFil™ needle, World Precision Instruments) connected to a syringe pump (Harvard Ultra) through a Teflon tube. The drops were gently transferred to the surface of a square cut from the base of a Corning® 60 mm suspension culture dish made from polystyrene, and then imaged from the side. The resultant equilibrium contact angles in air were found to be ~82° and ~80° using the analytical and sessile drop methods, respectively. Cells were prepared as previously described.

Results

The drop images of FIG. 20 were processed to measure the radius, $R_a$, where the dark region begins, from which a and light ray paths can be calculated; the resultant data is shown in Table 1 for a range of drop volumes with constant footprint diameter. Considering drops A-F (labelled a-f in FIG. 20); a ray of light entering the drop vertically at $R_a$ gives an average μ=12.8° (SD of 0.6°). The NA of the utilised objective provides $\mu_m$=14.5°. Considering the simplified assumption of parallel light entering the drop, this agreement is satisfactory; moreover the approximately constant value of μ for a range of drop volumes further illustrates the validity of the analysis. The maximum refracted angle for all drops considered occurs at the edge of the identical drops A & I (a and i in FIG. 20) as μ=48°; this is the largest value of α=θ=82. A microscope objective with NA=0.75, giving $\mu_m$=48.6°, was used to view a portion of this drop and the dark regions in the resultant image were minimized as shown in FIG. 20(*i*). Table 1 also shows that drops G-H result in μ<10° everywhere and hence dark regions are eliminated as shown in FIG. 20(*g*&*h*) using the NA=0.25 objective. The value of μ can be reduced further by overlaying the drops with an immiscible fluid of refractive index greater than air such as FC40 (a fluorocarbon with n=1.29); μ reduces from an averages of 12.8° in air to 1.3° for drop geometries A-F in Table 1.

TABLE 1

| Drop | Volume (μl) | $R_a$ (μm) | θ° | h (μm) | α°@$R_a$ | μ°@α(air) | μ°@α(FC40) |
|---|---|---|---|---|---|---|---|
| A | 1 | 466 | 82 | 726 | 33.6 | 12.0 | 1.5 |
| B | 0.8 | 485 | 73 | 618 | 33.8 | 12.1 | 1.1 |
| C | 0.7 | 531 | 68 | 558 | 36.0 | 13.0 | 1.2 |
| D | 0.6 | 581 | 61 | 492 | 37.5 | 13.7 | 1.3 |
| E | 0.4 | 696 | 45 | 346 | 36.1 | 13.1 | 1.2 |
| F | 0.3* | 835 | 35 | 263 | 35.0 | 12.6 | 1.2 |
| G | 0.2* | 835 | 24 | 177 | 24.0 | 8.2 | 0.8 |
| H | 0.1* | 835 | 13 | 91 | 12.5 | 4.2 | 0.4 |
| I | 1** | 835 | 82 | 726 | 82 | 48 | 10.9 |

*Data shown for completeness only and calculation based on α at the pinning line.

**Calculations for maximum refraction at maximum contact angle of all drops considered.

Table 1: Geometric parameter calculated for the drop images shown in FIG. 20 (some not shown) assuming drop shape is represented by the cap of a sphere.

To evaluate the ease with which cells can be identified using this method, four drops were placed on a suspension cell culture substrate with varying volumes, and constant footprint, as illustrated in 21*a*(*i*)-*d*(*i*). The drops were imaged as before and the influence of the FC40/water interface is evident through comparison between a(ii) and d(ii), where the dark annular region almost disappears with FC40 overlay. This is also evident between b(ii) and c(ii) where the outline of the drop almost disappears when overlaid with FC40 and hence provides perfect clarity for identifying cells in those regions. Drops created with cell suspension are shown in a-d(iii), and a section digitally magnified in a region near the pinning line in a-d(iv) to illustrate the ease of identify cells.

The cells in a(iv) are impossible to see in the dark regions, but single cell identification is possible in b-d(iv) with low cost microscopy. It is noted that with the d(iv) method the drop can still have substantial height, see Table 1 for numerical values, and hence cell may be outside of the microscope objective focal depth; two such cells are indicated in the image where there outline is visible but they are out of the focus. Hence, this approach would either require a vertical scan of the drop, or a settling period for the cells to fall to the base of the dish before commencing imaging to assure monoclonality. A high NA objective lens, as used in 20(*i*) would also remove the dark regions for the drops in column a, however higher costs, settling time issues as in d(iv), and higher magnification (higher NA lens typically have higher magnification or require specialised microscope) would make its use of limited benefit.

The approach of b(iv) & c(iv), where the drop height is reduced can remove the need for multiple images through the drop, and settling time, by forcing the drop to be sufficiently flat. Both of these approaches are efficient methods for identifying cells within well plate formats and appear good approaches for assuring monoclonality. A practical implementation of the method for single cell isolation and assurance of monoclonality could be; 1) form media drop in a well plate to fit in single image, 2) removing fluid from drop, 3) dispense nano-litres of single cell suspension into the drop using established low volume dispensing techniques, 3a) optionally overlay with FC40 if evaporation is problematic, 4) record image and confirm which wells contain a single cell, 5) fill the wells with media and process well plates as normal.

Further embodiments of the disclosure are defined in the following numbered clauses:

1. A method of providing an isolated single cell, comprising: forming on a substrate surface a test body of liquid, wherein a contact angle between the test body of liquid and the substrate surface is lower than an equilibrium contact angle; capturing an optical image of the test body of liquid; and analysing the captured image to determine whether one and only one cell is present in the test body of liquid.
2. The method of clause 1, wherein the contact angle between the test body of liquid and the substrate surface is nearer to a receding contact angle than to the equilibrium contact angle.
3. The method of clause 1 or 2, wherein the forming of the test body of liquid comprises: depositing a precursor body of liquid on the substrate surface; and removing a portion of the precursor body of liquid while the precursor body of liquid is in contact with the substrate surface.
4. The method of clause 3, wherein the one and only one cell, where present, is provided in the precursor body of liquid.
5. The method of clause 3, wherein: the method further comprises adding a further volume of liquid to an intermediate body of liquid formed by the removing of the portion of the precursor body of liquid, thereby providing the test body of liquid, the further volume of liquid being added before the capturing of the optical image of the test body of liquid; and the one and only one single cell, where present, is provided in the further volume of liquid.
6. The method of clause 5, wherein the volume of the test body of liquid, after the further volume of liquid has been added, is smaller than the volume of the precursor body of liquid.
7. The method of any of clauses 3-6, wherein the removing of the portion of the precursor body of liquid comprises removing at least 50% of the volume of the precursor body of liquid.
8. The method of any preceding clause, wherein the forming of the test body of liquid comprises bringing a wetted body into contact with the substrate surface and, subsequently, removing the wetting body from contact with the substrate surface.
9. The method of any preceding clause, wherein the forming of the test body of liquid comprises ejecting liquid from an ejection head while moving the ejection head relative to the substrate surface in such a way that a body of liquid is formed having a contact angle that is lower than the equilibrium contact angle.
10. The method of any preceding clause, further comprising overlaying the test body of liquid with an overlay liquid before the capturing of the optical image of the test body of liquid, the overlay liquid being immiscible with the test body of liquid.
11. The method of clause 10, wherein the refractive index of the overlay liquid is more similar to the refractive index of the test body of liquid than to the refractive index of air.
12. The method of any preceding clause, wherein: the substrate surface forms at least a portion of a boundary of a reservoir volume for cell culturing; and the reservoir volume is at least partially filled with liquid for cell culturing after it has been determined that the test body of liquid contains one and only one cell.
13. The method of clause 10, further comprising culturing a monoclonal colony of cells in the reservoir volume.
14. The method of clause 12 or 13, wherein the steps of forming, capturing and analysing are repeated for a plurality of reservoir volumes and a monoclonal colony of cells is cultured in each of the reservoir volumes in which it is determined that the test body of liquid contains one and only one cell.

15. The method of clause 14, wherein the plurality of reservoir volumes are separated from each other by solid walls.

16. The method of clause 15, wherein each test body of liquid is separated from all solid walls separating the reservoir volume from other reservoir volumes.

17. The method of clause 14, wherein the plurality of reservoir volumes are separated from each other by liquid walls.

18. A method of providing an isolated single cell, comprising: providing a test body of liquid on a substrate surface, the test body of liquid containing a single cell; overlaying the test body of liquid with an overlay liquid immiscible with the test body of liquid; capturing an optical image of the test body of liquid overlaid with the overlay liquid; and analysing the optical image to determine whether the test body of liquid comprises one and only one cell.

19. A method of providing an isolated single cell, comprising: forming on a substrate surface a test body of liquid, wherein a contact angle between the test body of liquid and the substrate surface is lower than 25 degrees; capturing an optical image of the test body of liquid; and analysing the captured image to determine whether one and only one cell is present in the test body of liquid.

20. An apparatus for providing an isolated single cell, comprising: a dispensing unit configured to form a test body of liquid on a substrate surface in such a way that a contact angle between the test body of liquid and the substrate surface is lower than an equilibrium contact angle; an optical system configured to form an optical image of the test body of liquid; and an analysis unit configured to analyse the captured image to determine whether one and only one cell is present in the test body of liquid.

21. An apparatus for providing an isolated single cell, comprising: a dispensing unit configured to provide a test body of liquid on a substrate surface, and to overlay the test body of liquid with an overlay liquid immiscible with the test body of liquid; an optical system configured to form an optical image of the test body of liquid overlaid with the overlay liquid; and an analysis unit configured to analyse the captured image to determine whether one and only one cell is present in the test body of liquid.

The invention claimed is:

1. A method of providing an isolated single cell, comprising:

providing a test body of liquid on a substrate surface, the test body of liquid containing a single cell;

overlaying the test body of liquid with an overlay liquid immiscible with the test body of liquid; and analysing an optical image of the test body of liquid overlaid with the overlay liquid to determine whether the test body of liquid comprises one and only one cell.

2. An apparatus for providing an isolated single cell, comprising:

a dispensing unit configured to form a test body of liquid on a substrate surface in such a way that a contact angle between the test body of liquid and the substrate surface is lower than an equilibrium contact angle;

an optical system configured to form an optical image of the test body of liquid; and an analysis unit configured to analyse the captured image to determine whether one and only one cell is present in the test body of liquid.

* * * * *